United States Patent [19]

Tanaka et al.

[11] Patent Number: 4,495,779
[45] Date of Patent: Jan. 29, 1985

[54] AIR CONDITIONER

[75] Inventors: Tatsuo Tanaka; Hiroshi Itoh; Akihiko Sugiyama, all of Fuji, Japan

[73] Assignee: Tokyo Shibaura Denki Kabushiki Kaisha, Kawasaki, Japan

[21] Appl. No.: 590,056

[22] Filed: Mar. 15, 1984

[30] Foreign Application Priority Data

Mar. 17, 1983 [JP] Japan ................................. 58-44710

[51] Int. Cl.³ ............................................. F25B 41/00
[52] U.S. Cl. ........................................ 62/211; 62/223
[58] Field of Search .................. 62/229, 228.4, 228.5, 62/211, 223

[56] References Cited

U.S. PATENT DOCUMENTS

| 4,083,197 | 4/1978 | Boehmer | 62/211 |
| 4,112,703 | 9/1978 | Kountz | 62/211 |
| 4,407,139 | 10/1983 | Ide et al. | 62/228.4 |

FOREIGN PATENT DOCUMENTS 5514987 6/1975 Japan .

Primary Examiner—William E. Wayner
Attorney, Agent, or Firm—Cushman, Darby and Cushman

[57] ABSTRACT

An air conditioner has a refrigeration cycle and a regulating circuit. The refrigeration cycle includes a compressor of variable exhaust amount type, a 4-way valve connected to the discharge side and suction side of the compressor, indoor-side and outdoor-side heat exchanges connected to the valve, and an expansion valve of a motor-driven tape. The regulating circuit regulates the flow rate of refrigerant into the indoor or outdoor side heat exchanger by adjusting the opening degree of the expansion valve in response to the amount of the refrigerant exhausted from the compressor, thereby setting the temperature of the refrigerant to be discharged from the compressor to a predetermined temperature responsive to the exhaust amount of the compressor.

5 Claims, 8 Drawing Figures

F I G. 6
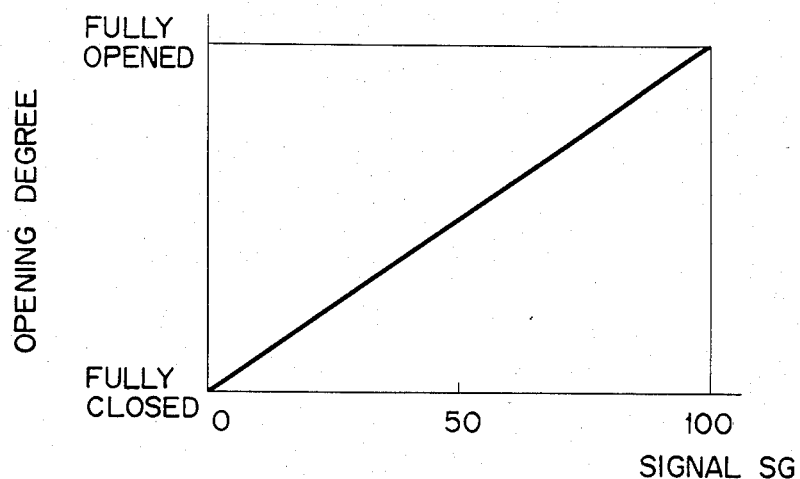
F I G. 7
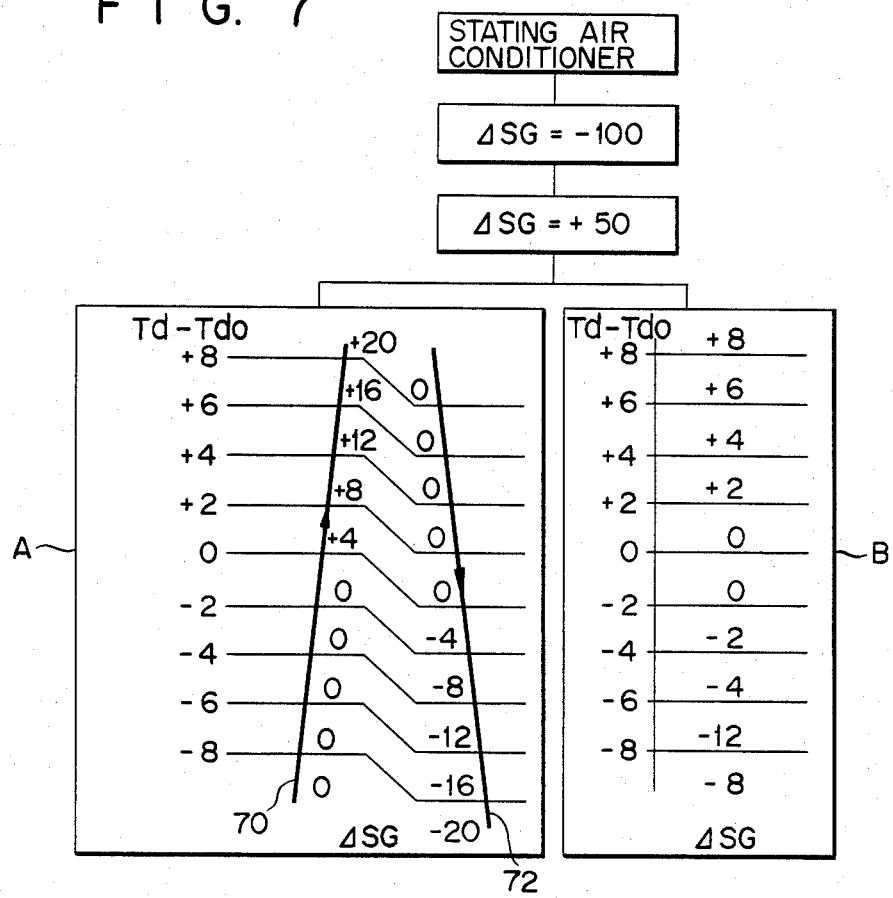

F I G. 8
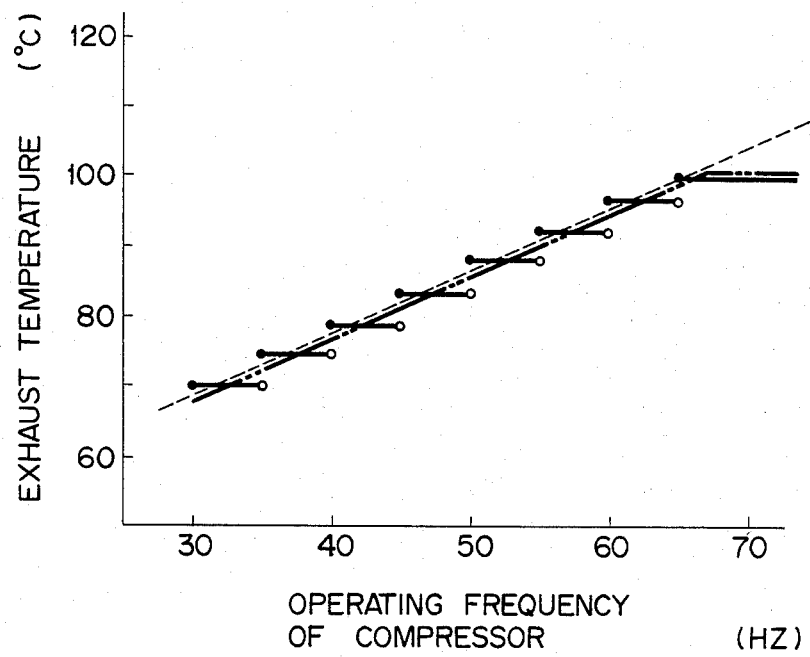

AIR CONDITIONER

BACKGROUND OF THE INVENTION

The present invention relates to an air conditioner and, more particularly, to an air conditioner which has a refrigeration cycle with a compressor of variable capacity.

Since an air conditioner which forms a refrigeration cycle of heat pump type can readily switch between room cooling and room heating operations, the conditioner is frequently used. However, a conventional compressor, which is used in a refrigeration cycle, always has a constant capacity and hence a constant exhaust amount and cannot, accordingly, operate in response to the load state in the refrigeration cycle. Consequently, the compressor cannot efficiently produce the refrigeration capacity of the refrigeration cycle.

Therefore, a compressor of the variable capacity type, i.e., variable exhaust amount type using 2-stage compression, pole change conversion, gas injection, liquid injection or release is employed as means for improving the room cooling or room heating capacity of the refrigeration cycle. Further, it has recently been proposed that the operating frequency of a compressor be controlled by an inverter, thereby varying the amount of the refrigerant to be exhausted from the compressor. The compressors of these types can adjust the exhaust amount in response to the load state of the refrigeration cycle, with the result that the room cooling or heating capacity of the refrigeration cycle as well as the energy-saving effect of the compressor can be improved.

In the refrigeration cycle having the compressor of this type, the exhaust amount of the compressor is variable, but the refrigerant temperature, discharged from the compressor, is controlled so as to always be constant. However, it is understood that the temperature of the exhausted refrigerant largely affects the influences of the room cooling or heating capacity of the refrigeration cycle. Accordingly, when the exhaust temperature of the refrigerant is always constant, the maximum capacity of the refrigeration cycle, responsive to the operating state of the compressor, cannot be performed, energy is used to drive the commpressor is an uneconomical manner, and the room cooling or heating efficiency of the refrigeration cycle frequently decreases.

SUMMARY OF THE INVENTION

The present invention has been made in consideration of the above situation and has for its object to provide an air conditioner in which a compressor can be always operated in an optimum state, thereby improving the energy-saving efficiency and room cooling or heating efficiency and preventing the compressor from being damaged.

In order to perform the above-described object, according to the present invention, there is provided an air conditioner which comprises a refrigeration cycle having a compressor of variable exhaust amount type, a first heat exchanger for condensing refrigerant, being connected to the compressor, a second heat exchanger for evaporating the refrigerant, being connected to the compressor, and an expansion valve capable of adjusting the opening degree thereof andconnected between the first and second heat exchanger; and regulating means for regulating the flow rate of refrigerant into the first or second heat exchanger by controlling the opening degree of the expansion valve, in response to the amount of the refrigerant exhausted from the compressor, to set the temperature of the refrigerant to be discharged from the compressor to a predetermined temperature responsive to the exhaust amount of the compressor.

According to the present invention as described above, the temperature of the refrigerant to be discharged from the compressor can be regulated by the regulating means to a predetermined temperature responsive to the exhaust amount of the compressor. Accordingly, the temperature of the exhausted refrigerant in a certain exhaust amount of the compressor can be set to a temperature at which the room cooling or heating capacity of the refrigeration cycle becomes best. In this manner, the room cooling or heating capacity of the refrigeration cycle can be improved, and wasteful energy for driving the compressor can be prevented.

BRIEF DESCRIPTION OF THE DRAWINGS

FIG. 6 is a view showing the relationship between an input signal and the opening degree of the expansion valve;

FIG. 7 is a view showing an example of a method for controlling the opening degree of the expansion valve; and FIG. 8 is a view showing the relationship between the operating frequency of the compressor in the air conditioner and the exhausted refrigerant temperature.

DETAILED DESCRIPTION OF THE PREFERRED EMBODIMENT

An embodiment of the present invention will be described in detail with reference to the accompanying drawings.

Figure 1:
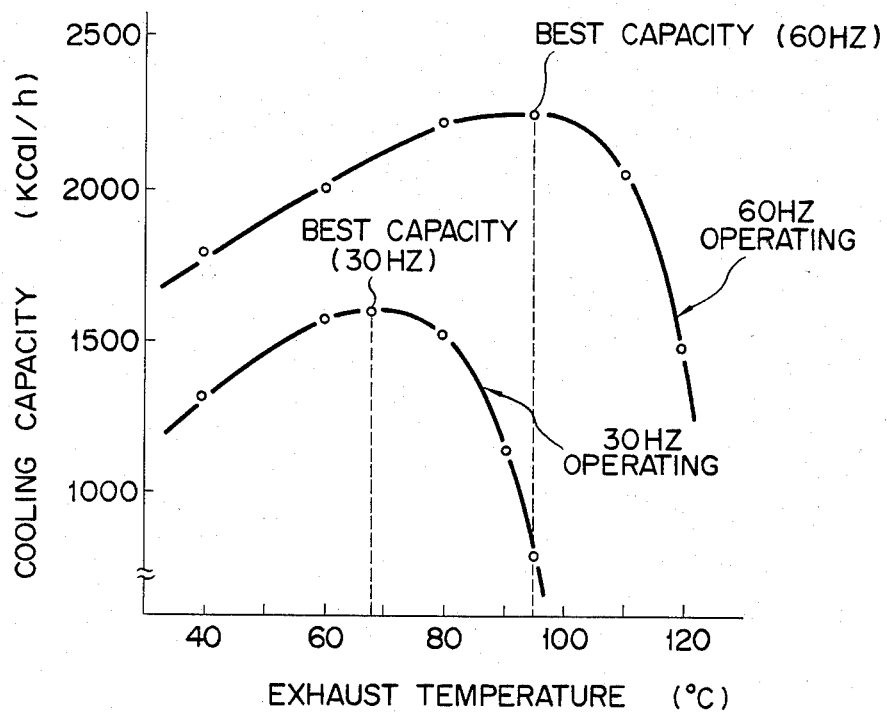
FIG. 1 is a diagram illustrating the relationship between the temperature of the refrigerant exhausted from a compressor and the room cooling capacity of a refrigeration cycle.

FIG. 1 shows the measured result of the relationship between the exhausted refrigerant temperature of a compressor in which the operating frequency and hence the amount of the refrigerant to be exhausted from the compressor is controlled, for example, by an inverter, and the room cooling capacity of the refrigeration cycle having the compressor. The measurement was conducted under the conditions of 27° C. of dry bulb temperature, 19.5° C. of wet bulb temperature in a room, 35° C. of dry bulb and 24° C. of wet bulb out of a room. As apparent from FIG. 1, it is understood that, when the compressor is operated by varying the operating frequency of the compressor, the temperatures, at which the refrigeration cycle exhibits the maximum cooling capacity, of the refrigerant exhausted from the compressor differ between cases where the exhaust amount is small (operated in 30 Hz of frequency) and cases where the exhaust amount is large (operated in 60

Figure 2:
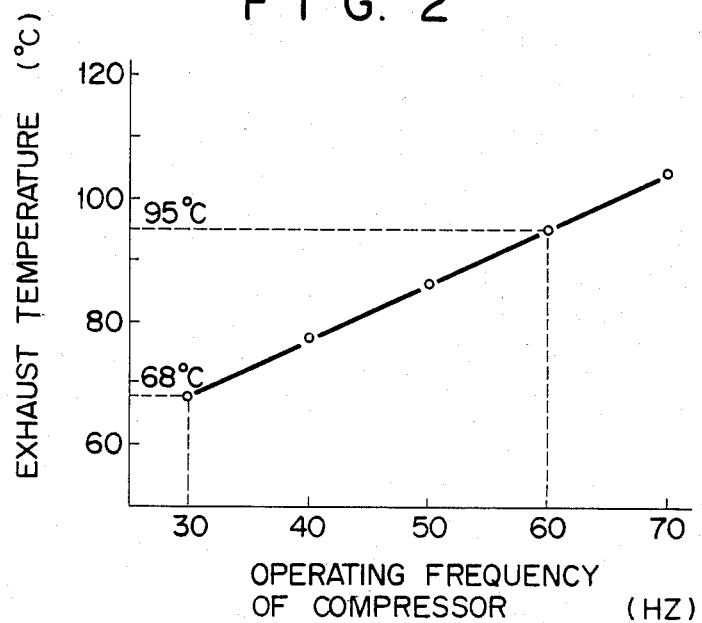
FIG. 2 is a view illustrating the relationship between the compressor operating frequency and the exhausted refrigerant temperature for producing the best cooling capacity.

Hz of frequency). As shown in FIG. 2, when the operating frequency of the compressor increases, the temperature of the exhausted refrigerant from the compressor, for producing the maximum cooling capacity, increases proportionally to the operating frequency of the compressor.

Figure 3:
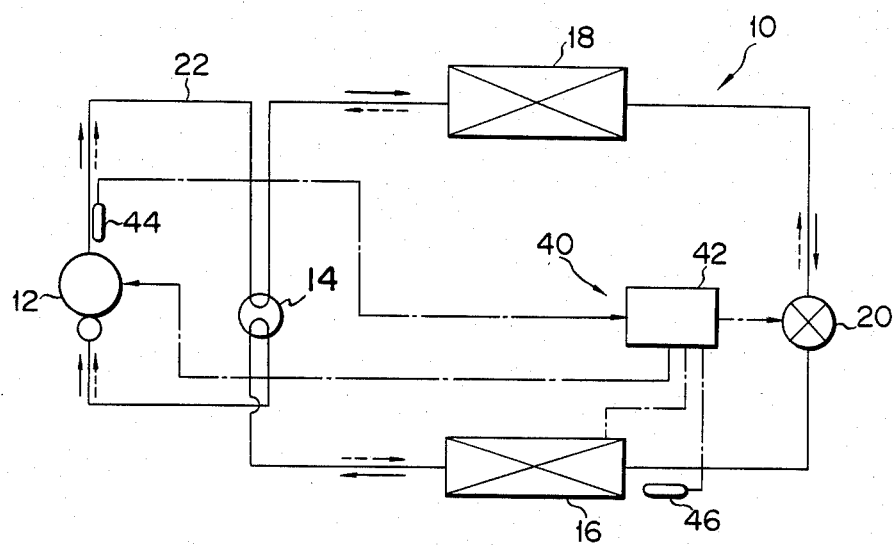
FIG. 3 is a block diagram schematically showing an air conditioner according to one embodiment of the present invention.

FIG. 3 shows the refrigeration cycle 10 of an air conditioner according to an embodiment of the present invention. This refrigeration cycle 10 includes a compressor 12 capable of adjusting the exhaust amount of refrigerant by controlling the operating frequency of the compressor, a 4-way valve 14 connected to the exhaust side and suction side of the compressor, indoor-side and outdoor-side heat exchangers 16 and 18 connected to the 4-way valve, and a motor-driven type expansion valve 20 as a pressure reducing device connected between the indoor-side heat exchanger and the outdoor-side heat exchanger. These components are connected through refrigerant tubes 22.

Figure 4:
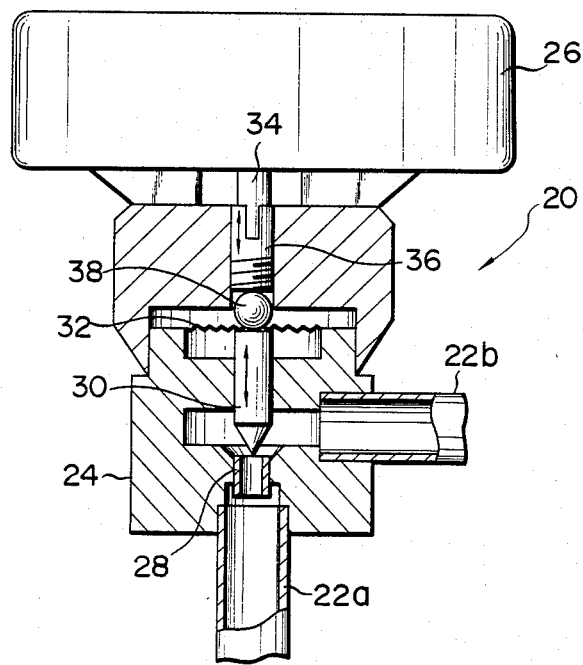
FIG. 4 is an enlarged view of an expansion valve.

The expansion valve 20 has, as shown in FIG. 4, a valve body 24, and a step motor 26 mounted on the valve body. To the valve body 24 are connected a refrigerant tube 22a which communicates with the heat exchanger 16, and a refrigerant tube 22b which communicates with the heat exchanger 18. The tubes 22a, 22b communicate with the each other through a valve port 28 formed in the valve body 24. The expansion valve 20 has a valve rod 30 which is arranged slidably in the valve body 24 and opens or closes the valve port 28, a diaphragm 32 supporting the valve rod and sealing the valve port, a driver 36 screwed into the valve body and connected to the drive shaft 34 of the step motor 26, and a ball 38 arranged between the diaphragm and the driver. When the step motor 26 is driven and the shaft 34 is rotated, the driver 36 is rotated to move downwards or upwards. Thus, the driver 36 slides the valve rod 30 through the ball 38 and the diaphragm 32. As a result, the valve rod 30 opens or closes the valve port 28, thereby adjusting the flowing area of the refrigerant passing through the port.

The air conditioner also has regulating means 40 for regulating the opening degree of the expansion valve 20 to adjust the temperature of the exhausted refrigerant from the compressor 12 in response to the operating frequency of the compressor. The regulating means 40 has a regulating circuit 42, a first temperature sensor 44 for detecting the temperature of the exhausted refrigerant from the compressor 12, and a second temperature sensor 46 for detecting the temperature in the room in which the indoor-side heat exchanger 16 is installed. The regulating circuit 42 is electrically connected to the step motor 26 of the expansion valve 20, the compressor 12, the first and second temperature sensors 44 and 46, and a keyboard (not shown) provided at the indoor side heat exchanger 16 for setting the temperature.

The regulating circuit 42 is, for example, composed of a microcomputer, and has a memory and computing circuit, and an inverter circuit (an operating frequency control circuit).

Figure 5:
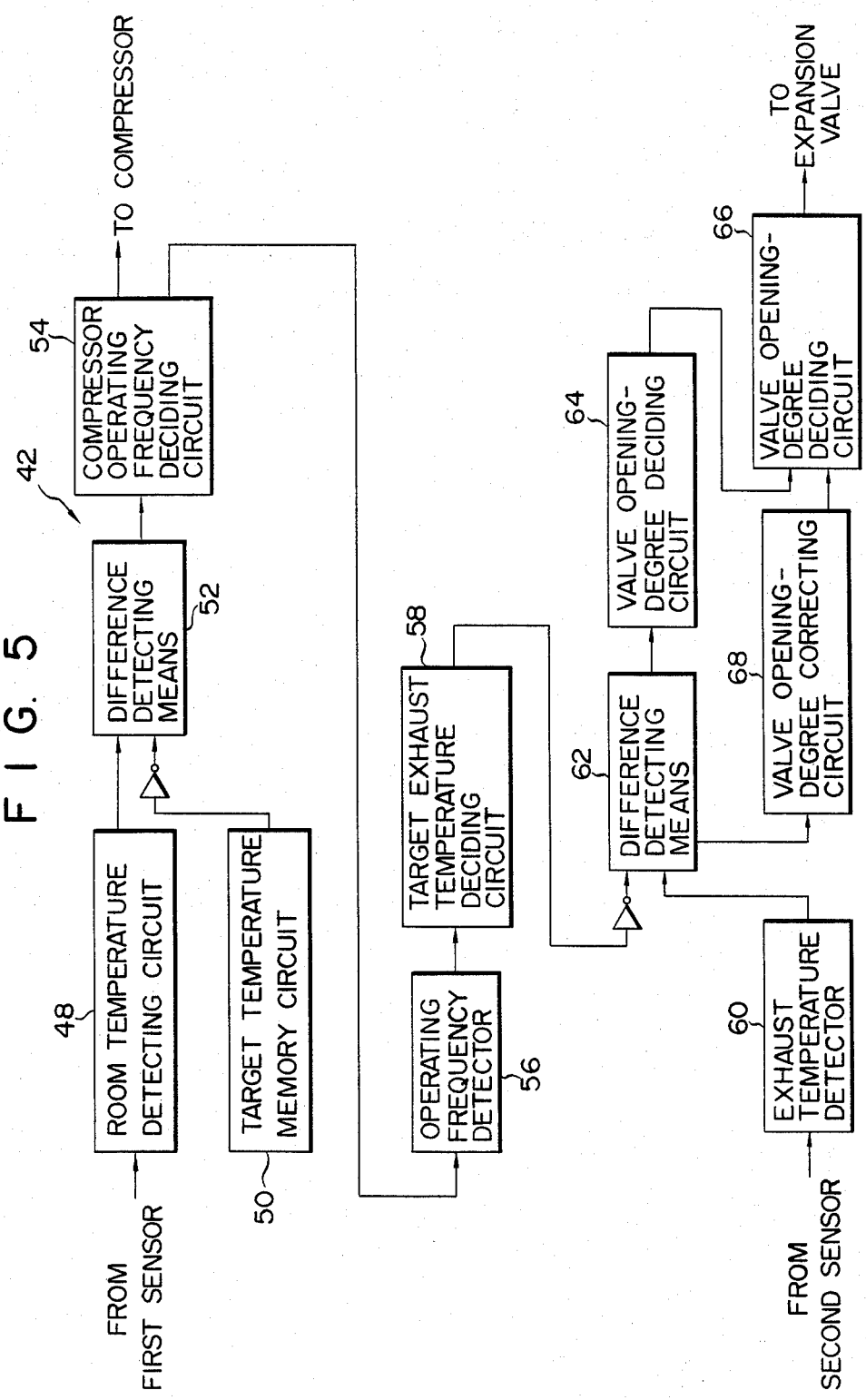
FIG. 5 is a block diagram illustrating an example of regulating means.

FIG. 5 shows an example of the regulating circuit 42. This regulating circuit 42 compares the target temperature set by the keyboard with the actual room temperature detected by the second sensor 46 and regulates the operating frequency of the compressor 12 in response to the difference between the target temperature and the actual room temperature. Then, the circuit 42 adjusts the opening degree of the expansion valve 20 in response to the operating frequency of the compressor, thereby regulating the refrigerant temperature exhausted from the compressor.

When the cooling operation is conducted by the refrigeration cycle 10, the refrigerant circulates in the refrigeration cycle along the direction designated by an arrow with a solid line. In other words, the refrigerant flows through the compressor 12, the valve 14, the outdoor-side heat exchanger 18, the expansion valve 20, the indoor-side heat exchanger 16, the valve and the compressor in this sequence. The refrigerant is evaporated in the heat exchanger 16 to remove latent evaporation heat from the room, thereby performing the cooling operation.

When room heating operation is carried out, the refrigerant circulates in the refrigeration cycle 10 along the direction designated by an arrow with a broken line. In other words, the refrigerant flows from the compressor 12 through the valve 14, the heat exchanger 16, the expansion valve 20, the heat exchanger 18, and the valve to the compressor. The refrigerant is condensed in the heat exchanger 16 to discharge condensed heat to the room, thereby performing the heating operation.

In the room cooling or heating operation, the first temperature sensor 44 always detects the temperature of the exhausted refrigerant from the compressor 12, and delivers a signal to the regulating circuit 42. Similarly, the second temperature sensor 46 detects the room temperature in the room to be air conditioned and delivers a signal to the regulating circuit 42. In the regulating circuit 42, the signal from the sensor 46 is detected by a room temperature detecting circuit 48, and the temperature set by the keyboard is stored in a target temperature memory circuit 50. The actual temperature detected by the circuit 48 is compared by a difference detecting means 52 with the target temperature stored in the memory circuit 50, and the detecting means 52 delivers the signal responsive to the difference to a compressor operating frequency deciding circuit 54. The deciding circuit 54 decides the operating frequency of the compressor 12 on the basis of the signal from the difference detecting means 52 and applies a corresponding signal to the compressor.

The signal from the deciding circuit 54 is detected by a operating frequency detector 56 and is then applied to a target exhaust temperature deciding circuit 58. The deciding circuit 58 decides the target temperature of the refrigerant to be exhausted from the compressor 12, i.e., the temperature of the exhausted refrigerant for maximizing the capacity of the refrigeration cycle, in response to the operating frequency of the compressor. The signal from the sensor 44 is detected by an exhaust temperature detector 60, and the actual detected exhaust temperature is compared by difference detecting means 62 with the target exhaust temperature decided by the deciding circuit 58. The detecting means 62 applies the signal, responsive to the difference of these temperatures, to a valve opening degree deciding circuit 64. The deciding circuit 64 determines the opening degree of the expansion valve 20 in response to the signal from the detecting means 62 and applies the signal to the other valve-opening degree deciding circuit 66. The signal from the detecting means 62 is also applied to a valve-opening degree correcting circuit 68. The correcting circuit 68 applies a correction signal to the deciding circuit 66 in response to the signal. The deciding circuit 66 determines the opening degree of the valve 20 in response to the signals from the deciding circuit 64 and the correcting circuit 68 and supplies the opening signal to the step motor 26 of the expansion valve. The motor 26 is driven in response to the signal to drive the valve body 30, thereby regulating the flow area of the valve port 28. Thus, the amount of the refrigerant passing through the valve port 28 is adjusted, and the flow rate of the refrigerant fed to the heat exchanger 16 or 18 is regulated. As a result, the temperature of the exhaust refrigerant from the compressor 12 is regulated to the optimum temperature in response to the operating frequency of the compressor.

The opening degree of the expansion valve 20 is decided as follows:

The opening degree of the expansion valve 20 is varied, as shown in FIG. 6, in proportion to the signal SG from the deciding circuit 66. FIG. 7 is a flow chart illustrating the operations which the deciding circuit 64 and the correcting circuit 68 perform to the valve 20 from the time of starting the air conditioner operation to the time at which the target temperature is obtained.

As shown in FIG. 7, when the air conditioner is started, a signal of valve-opening alteration signal number, $\Delta SG = -100$, is applied to the valve 20 to be bring the valve into fully closed state which is used as a reference is deciding the opening degree of the valve. Thus, the valve is temporarily and fully closed by the signal, even if the valve 20 is set at any opening degree in the range of from 0 to 100 SG before the signal is applied. Then, a signal of $\Delta SG = +50$ is supplied, the valve 20 is set into the halfly opened state as a first opening degree, and a predetermined amount of refrigerant flows through the expansion valve.

When the difference $Td-Td_0$ between the present temperature $Td$ of the exhausted refrigerant from the compressor 12 and the target temperature $Td_0$ decided by the deciding circuit 58 is increasing (along line 70) or decreasing (along line 72), the opening degree of the expansion valve 20 is decided according to the control method in type A in the deciding circuit 64. The (+) in $\Delta SG$ designates the opening of the valve and (−) designates the closing. When the temperature difference $Td-Td_0$ stays in the same zone, for example, in the zone of +2 to +4, for longer than 5 minutes, the opening degree of the expansion valve is corrected in accordance with the control of type B in the correcting circuit 68.

In any of the types A and B, the temperature of the exhausted refrigerant is regulated, as shown in FIG. 8, to the optimum temperature in response to the operating frequency of the compressor 12. There are two types of control method such as, a stepwise control having a width of a predetermined degree of the operating frequency to the exhaust temperature, and a linear control corresponding the optimum exhaust temperature to the operating frequency of the compressor. In either case, the exhaust temperature for producing the maximum capacity of the refrigeration cycle 10 can be obtained in response to the operating frequency of the compressor 12.

According to the air conditioner constructed as described above, regulating means 40 is provided to regulate the temperature of the exhausted refrigerant from the compressor to a predetermined temperature, responsive to the operating frequency and hence the amount of the refrigerant exhausted from the compressor. Accordingly, the exhaust temperature of the refrigerant in a predetermined exhaust amount of the compressor can be set to a temperature at which the cooling or heating capacity of the refrigeration cycle is maximized. In this manner, the efficiency of the refrigeration cycle can be improved, and the operation of the compressor can be efficiently performed, thereby reducing the wasteful energy and preventing the compressor from being damaged.

In the embodiments described above, the compressor of variable operating-frequency type has been used. However, the present invention is not limited to this. In other words, the compressor may be of the variable capacity type or variable exhaust amount type. For example, a compressor of 2-stage compression, pole change conversion type, gas injection type or liquid injection type may be employed.

What is claimed is:

1. An air conditioner comprising:
   a refrigeration cycle circuit having a compressor of variable exhaust amount type, a first heat exchanger for condensing refrigerant, being connected to the compressor, a second heat exchanger for evaporating the refrigerant, being connected to the compressor, and a regulating valve capable of adjusting the opening degree thereof and connected between the first and second heat exchangers; and
   regulating means for regulating the refrigerant flow rate to the first or second heat exchanger by adjusting the opening degree of the regulating valve in response to the amount of the refrigerant exhausted from the compressor to set the exhaust temperature of the refrigerant from the compressor to a predetermined temperature responsive to the amount of the refrigerant exhausted from the compressor.

2. An air conditioner according to claim 1, wherein said compressor is of the variable operating frequency type, the regulating valve is of the motor-driven type, and the regulating means comprises detecting means for detecting the temperature of refrigerant exhausted from the compressor, operating frequency detecting means for detecting the operating frequency of the compressor, means for deciding the target temperature of the exhausted refrigerant from the compressor in response to the operating frequency of the compressor, difference detecting means for detecting the difference between the exhaust temperature detected by the detecting means and the target temperature, and valve-opening degree deciding means for deciding the opening degree of the regulating valve in response to the difference to open or close the regulating valve.

3. An air conditioner according to claim 1, wherein said opening degree deciding means includes correcting means for correcting the opening degree of the regulating valve in response to the temperature difference detected by the difference detecting means.

4. An air conditioner according to claim 2, wherein said regulating means comprises room temperature detecting means for detecting the temperature in the room to be conditioned, memory means for storing the target room temperature, difference detecting means for detecting the difference between the room temperature detected by the room temperature detecting means and the target room temperature, and operating frequency detecting means for deciding the operating frequency of the compressor in response to the difference between the room temperature and the target room temperature and applying a signal to the compressor.

5. An air conditioner according to claim 1, wherein said refrigeration cycle includes a 4-way valve connected the exhaust side and the suction side of the compressor, and the first and second heat exchanger are connected to the compressor through the 4-way valve.

* * * * *